United States Patent
Matveev

(10) Patent No.: US 7,280,674 B2
(45) Date of Patent: Oct. 9, 2007

(54) DEVICE AND METHOD FOR OBJECT ILLUMINATION AND IMAGING USING TIME SLOT ALLOCATION BASED UPON ROAD CHANGES

(75) Inventor: Oleg Matveev, Gainesville, FL (US)

(73) Assignee: University of Florida Research Foundation, Gainesville, FL (US)

( * ) Notice: Subject to any disclaimer, the term of this patent is extended or adjusted under 35 U.S.C. 154(b) by 856 days.

(21) Appl. No.: 10/448,172

(22) Filed: May 28, 2003

(65) Prior Publication Data
US 2003/0198271 A1 Oct. 23, 2003

Related U.S. Application Data

(63) Continuation-in-part of application No. 10/157,359, filed on May 28, 2002, now abandoned.

(60) Provisional application No. 60/295,699, filed on Jun. 5, 2001.

(51) Int. Cl.
*G06K 9/00* (2006.01)

(52) U.S. Cl. ............... 382/104; 362/507; 372/25; 340/933; 701/301

(58) Field of Classification Search ........... 382/100, 382/104; 372/25, 30; 362/507; 340/933; 701/301
See application file for complete search history.

(56) References Cited

U.S. PATENT DOCUMENTS

| | | | |
|---|---|---|---|
| 4,642,452 A | 2/1987 | Loy | |
| 4,970,628 A | 11/1990 | Bergkvist | |
| 5,013,917 A * | 5/1991 | Ulich | 250/330 |
| 5,172,113 A * | 12/1992 | Hamer | 340/907 |
| 5,255,163 A | 10/1993 | Rainer | |
| 5,383,200 A | 1/1995 | Barrett et al. | |
| 5,442,358 A * | 8/1995 | Keeler et al. | 342/54 |
| 5,495,243 A * | 2/1996 | McKenna | 340/902 |
| 5,710,553 A * | 1/1998 | Soares | 340/903 |
| 6,008,496 A | 12/1999 | Winefordner et al. | |
| 6,275,773 B1 | 8/2001 | Lemelson et al. | |
| 6,370,475 B1 | 4/2002 | Breed et al. | |
| 6,711,280 B2 * | 3/2004 | Stafsudd et al. | 382/106 |
| 2002/0005778 A1 * | 1/2002 | Breed et al. | 340/435 |
| 2002/0176605 A1 * | 11/2002 | Stafsudd et al. | 382/106 |

OTHER PUBLICATIONS

Hamit, F., "The Cadillac's Oncoming "Night Vision" Option," Advanced Imaging, 10:34-36, 1998.

(Continued)

Primary Examiner—Vikkram Bali
Assistant Examiner—Anand Bhatnagar
(74) Attorney, Agent, or Firm—Akerman Senterfitt

(57) ABSTRACT

A reduced glare imaging system for motor vehicles. The reduced glare imaging system includes at least one light source capable of modulation, a synchronization system including structure for obtaining a time reference, and a processor for determining a fixed time based upon which roadway a motor vehicle is disposed. The fixed time can be used to determine a repeating time slot. The imaging system also includes a trigger for modulating emissions of periodic light pulses from the light source. Accordingly, the periodic light pulses can be synchronized with the repeating time slot. A receiver is also provided with the system for receiving radiation resulting from the light pulses being scattered by objects. The radiation can be received during a gating period which correlates to the light pulses. The radiation can be presented as images on a display.

24 Claims, 5 Drawing Sheets

OTHER PUBLICATIONS

Schaff, F., "Beyond the Visible: The ABCs of IR," Photonics Spectra, 146-148, 150, 2000.

Canadian Driver News, "DaimlerChrysler develops Active Night Vision technology," www.canadiandriver.com/news/000406-2.htm, 2000.

Aebi et al., "Laser-illuminated viewing provides long-range detail," Laser Focus World, 147-149, 2000.

DaimlerChrysler-News, "Improving Night Vision," www.daimlerchrysler.de/news/top/2000/t00405_e.htm, 2000.

Winefordner et al., "Novel uses of lasers in atomic spectroscopy," J. Analytical Atomic Spectroscopy, 15:1161-1189, 2000.

Matveev et al., "Relevance of the Luminosity-Resolving Power Product for Spectroscopic Imaging," Applied Spectroscopy, 53:1341-1346, 1999.

Matveev et al., "Narrow-band resonance-ionization and fluorescence imaging in a mercury-vapor cell," Optics Letters, 23:304-306, 1998.

Matveev et al., "Resonance ionization image detectors: basic characteristics and potential applications," Applied Optics, 36:8833-8843, 1997.

Rebane, A., Trends in Optics, A. Consortium Ed. Academic Press, San Diego, "Femtosecond time-and-space-domain holography," 165-188, 1996.

AFRL and the Air Force Battlelabs, "Applying AFRL technology to battlelab initiatives provides innovation to the warfighter," AFRL Technology Horizons, 2002.

Thornton, B., "Night Vision System Has Brilliant Future," http://www.clarechampion.ie/01/aug/cc20010824/fe_nv.htm.

NHTSA, "Traffic Safety Facts 1999," A Public Information Fact Sheet on Motor Vehicle and Traffic Safety, 1999.

Popular Science Magazine, "Cutting-Edge Luxury," Dec. 1999.

Jones et al., "OLED/CMOS combo opens a new world of microdisplay," Laser Focus World, 55-58, 2001.

AEBI et al., "Laser-illuminated viewing provides long range detail," Laser Focus World, 147-150, 2000.

National Institute of Standards and Technology, "NIST Radio Station WWVB," www.boulder.nist.gov/timefreq/stations/wwvb.html.

Lewandowski et al., "GPS+GLONASS: Toward Subnanosecond Time Transfer," www.gpsworld.com/0499/0499feat.html.

Products Catalog of True Time, Inc., www.truetime.com.

Yin et al., "Theoretical model for a Faraday anomalous dispersion optical filter," Optics Letters, 16:1617-1619, 1991.

Billmers et al., "Experimental demonstration of an excited-state Faraday filter operating at 532 nm," Optics Letters, 20:106-108, 1995.

Dressler et al., "Theory and experiment for the anomalous Faraday effect in potassium," Journal Optical Society of America, 13:1849-1858, 1996.

Williams et al., "Magneto-optic Doppler analyser: a new instrument to measure mesopause winds," Applied Optics, 35:6494-6503, 1996.

Moerner et al., "Persistent Spectral Hole-Burning: Science and Applications," Springer Verlag, 1998.

Ham et al., "Enhanced nondegenerate four-wave mixing owing to electromagnetically induced transparency in a spectral hole-burning crystal," Optics Letters, 22:1138-1140, 1997.

Hemmati et al., "Narrow-Band Optical Filters Made by Spectral Hole-Burning," NASA Tech Brief, 54, 1997.

Fujita et al., "Room-temperature persistent spectral hole burning of Eu3+ in sodium aluminosilicate glasses," Optics Letters, 23:543-545, 1998.

Matveev, "Atomic Resonance Spectrometers and Filters (Review)," 1987 Plenum Publishing Corporation, 217-230.

McKnight, "Too Old to Drive?," Issues in Science and Technology, 1-7, 2000.

* cited by examiner

DEVICE AND METHOD FOR OBJECT ILLUMINATION AND IMAGING USING TIME SLOT ALLOCATION BASED UPON ROAD CHANGES

CROSS-REFERENCE TO RELATED APPLICATIONS

The present application is a continuation-in-part of U.S. patent application Ser. No. 10/157,359 entitled Device and Method for Vehicular Invisible Road Illumination and Imaging, filed May 28, 2002, now abandoned which claims the priority of U.S. provisional patent application Ser. No. 60/295,699, filed Jun. 5, 2001.

BACKGROUND

1. Field of the Invention

The present invention relates to a reduced glare imaging system for motor vehicles, and more particularly to roadway illumination systems which do not cause glare for oncoming drivers.

2. Discussion of the Related Art

Both the human and economic costs resulting from automobile accidents are staggering. In 1994 alone the economic cost of automobile accidents was more than $150.5 billion. By 2000 the annual cost had skyrocketed to $230.6 billion, and the cost continues to rise. Tragically, the toll on human life is even more devastating, especially at night. Nighttime driving represents only about 28 percent of total driving, yet it accounts for about 55 percent of all traffic fatalities. On a per mile basis, driving at night is more than three times as likely to result in a fatality as compared to driving during daylight. In 1996 alone there were more than 18,000 fatal nighttime automobile accidents, including approximately 3,500 pedestrian fatalities and 368 bicyclist fatalities. Significantly, nighttime pedestrian fatalities represent about two-thirds of all pedestrian fatalities caused by automobiles. While several factors affect these statistics, limited vision is one of the main reasons behind the high rate of automobile accidents and fatalities. In particular, a large percentage of nighttime car accidents occur either due to inadequate illumination of the roadway or due to drivers being blinded by oncoming cars.

Several scientific conceptions are currently under different stages of development to improve driving safety at night. One concept uses ultra-violet (UV) light, which is invisible to oncoming drivers, to supplement an automobile's high beam headlights. This method is described in U.S. Pat. No. 4,970,628 to Bergkvist. Another automobile headlight concept using UV light is disclosed in U.S. Pat. No. 5,255,163 to Neumann (Neumann). Neumann discloses a headlight for a motor vehicle which includes a gas discharge lamp as a light source emitting both UV and visible light.

UV road illumination has several substantial drawbacks, however. Notably, UV light does not adequately illuminate many obstacles on the road. Hence, if a driver becomes too reliant on UV lamps, the driver may miss important imaging information, which increases the probability of car accidents at night. Fluorescing materials which improve illumination in the UV spectrum can be installed into roads, but in the U.S. alone the expense of installing the fluorescing materials onto all roadways will run into the billions of dollars. Further, many natural objects will still be difficult to see if only UV illumination is used to illuminate a roadway. Thus, even if UV road illumination is implemented into vehicles, low beam headlights will probably still be used to insure adequate illumination. Low beam headlights, however, can produce glare for oncoming drivers.

UV light also can be hazardous to pedestrians and oncoming drivers since UV light emanating from an automobile's headlights is likely be brighter than ambient UV light received from the sun on a typical summer afternoon. Since pedestrians and oncoming drivers will not see the UV light, they likely will not close their eyes as they would if they were looking directly at the sun. Notably, the eye of a pedestrian is likely to be opened wider during the night as compared to the day. Moreover, the pupil of an eye is one to two orders of magnitude larger at night. Accordingly, pedestrians and oncoming drivers are likely to receive a total exposure of UV light which can be damaging to their eyes.

Infrared (IR) thermal imaging using light having a wavelength of approximately 9-10 $\mu$m is another illumination concept currently being developed. In fact, IR thermal imaging cameras are commercially available on certain automobiles. Thermal imaging has several drawbacks, however. Significantly, since the 9-10 $\mu$m wavelength is 20 times longer than visible radiation, the spatial resolution of an image generated by IR thermal imaging is 20 times worse than the resolution obtained using visible light. In particular, an IR thermal image has a resolution which is typically only 76800 pixels (320×240), two orders of magnitude less than the resolution of modern charged coupled device (CCD) cameras, or the human eye.

In addition to the resolution limitations of IR thermal imaging, road image contrast, sharpness and brightness of an IR thermal imaging system is dependent on ambient temperature. Objects on a road which have equal temperature, for example tires, trees or stones on the road, might not be distinguishable. For example, if an ambient temperature is close to the temperature of a human body (36° C.), humans will not be seen or will be seen with poorly distinguishable contrast. If the ambient temperature is too cold, for example –25° C., the brightness and the contrast of the IR thermal images might be two to three times worse in comparison to images taken with a warmer ambient temperature, for instance +25° C. Another issue with IR thermal imaging is that an image of an object which is taken during a rain storm, or immediately thereafter, will be different than an image of the same object which is taken when ambient conditions are dry.

A number of other active and semi-active night viewing devices are known. Such systems often use a target illumination system which is pulsed, such as a pulsed laser, and an imaging system. The imaging systems are sometimes gated or provided with a spectrally selective filter in an attempt to filter out visible light from oncoming automobiles. However, current systems using these techniques are not able to block enough visible light from oncoming vehicle headlights to provide high resolution images. For instance, the period between laser pulses is not adequate to provide a precise image. Moreover, spectral filters currently used are not sufficiently selective to distinguish scattered light from light generated by headlights of oncoming vehicles. Further, the energy required for generating the illumination pulses is quite high in order to have an acceptable signal to noise ratio.

SUMMARY OF THE INVENTION

The present invention relates to a reduced glare imaging system for motor vehicles. The reduced glare imaging system includes at least one pulsed light source, a synchronization system including structure for obtaining a time reference, and a processor for determining a fixed time based upon which roadway a motor vehicle is disposed. For example, the processor can receive data representing the vehicles location and/or direction of travel. The fixed time can be used to determine a repeating time slot. Further, the time slot can be referenced to a timing signal, for example a wirelessly propagated RF synchronization signal from a global positioning system, a local positioning system, a wide area augmentation system, and/or a roadway indicator can be used to identify the repeating time slot. In one arrangement, the synchronization signal can be synchronized with Coordinated Universal Time (UTC).

The imaging system also includes a trigger for modulating emissions of periodic light pulses from the light source. Accordingly, the periodic light pulses can be synchronized with the repeating time slot. A receiver is also provided with the system for receiving scattered light resulting from object illumination by the light pulses. The scattered light is received during a gating period which correlates to the light pulses. Imaging information obtained from the scattered light can be presented as images on a display.

The fixed time can be used in conjunction with the time reference to determine the repeating time slot. Further, the processor can evaluate the lane of the roadway on which the vehicle is disposed and/or the direction of movement of the vehicle to determine the repeating time slot. The time slot can have a duration at least as long as a duration of the gating period. The duration of the gating period can be approximately equal to the sum of $(2D_S/c)+\Delta T_{PULSE}$, where $\Delta T_{PULSE}$ is a duration of at least one of said periodic light pulses, $D_S$ is a desired illumination distance for the imaging system's field of operation, and c is the speed of light.

The roadway on which the vehicle is disposed can be identified by data received from a global positioning system, a local positioning system, a wide area augmentation system and/or a roadway indicator. The data can be processed using a database to determine the fixed time. The fixed time can also be received from an RF signal transmitted by a roadway indicator. The time reference can further be provided with a synchronization signal. A second repeating time slot can be selected upon losing a reception of the time reference. The fixed time can be changed to a second fixed time upon the motor vehicle approaching an intersection or the motor vehicle changing roadways. Further, the repeating time slot can be changed to a second repeating time slot.

Although methods and materials similar or equivalent to those described herein can be used in the practice or testing of the present invention, suitable methods and materials are described below. The particular embodiments discussed below are illustrative only and not intended to be limiting. All publications, patent applications, patents, and other references mentioned herein are incorporated by reference in their entirety. In case of conflict, the present specification, including definitions, will control.

DETAILED DESCRIPTION OF THE PREFERRED EMBODIMENTS

The present invention relates to an imaging system for motor vehicles which emits electromagnetic pulses and receives scattered light from objects illuminated by the pulses for object illumination and imaging. In particular, the present invention includes a pulsed light source which emits relatively low energy electromagnetic pulses in one or more parts of the light spectrum. Radiation resulting from the electromagnetic pulses (light pulses) being scattered by objects can be received during specific light reception gating periods and processed to provide accurate images of the objects. For example, the imaging system can provide accurate images of a road and oncoming vehicles. The amount of time that elapses between each light pulse cycle can be divided into individual time slots. Further, the light pulse and gating period for each imaging system can be configured to occur in a specific timeslot.

Notably, groups of time slots can be allocated to vehicles traveling in a particular direction on a particular roadway. Thus, vehicles approaching each other on a roadway will utilize time slots from different time slot groups. Vehicles approaching an intersection from two different roadways also will utilize time slots from different groups. Accordingly, glare from the oncoming vehicles can be virtually eliminated.

Light Pulse Generation and Detection

Figure 1:
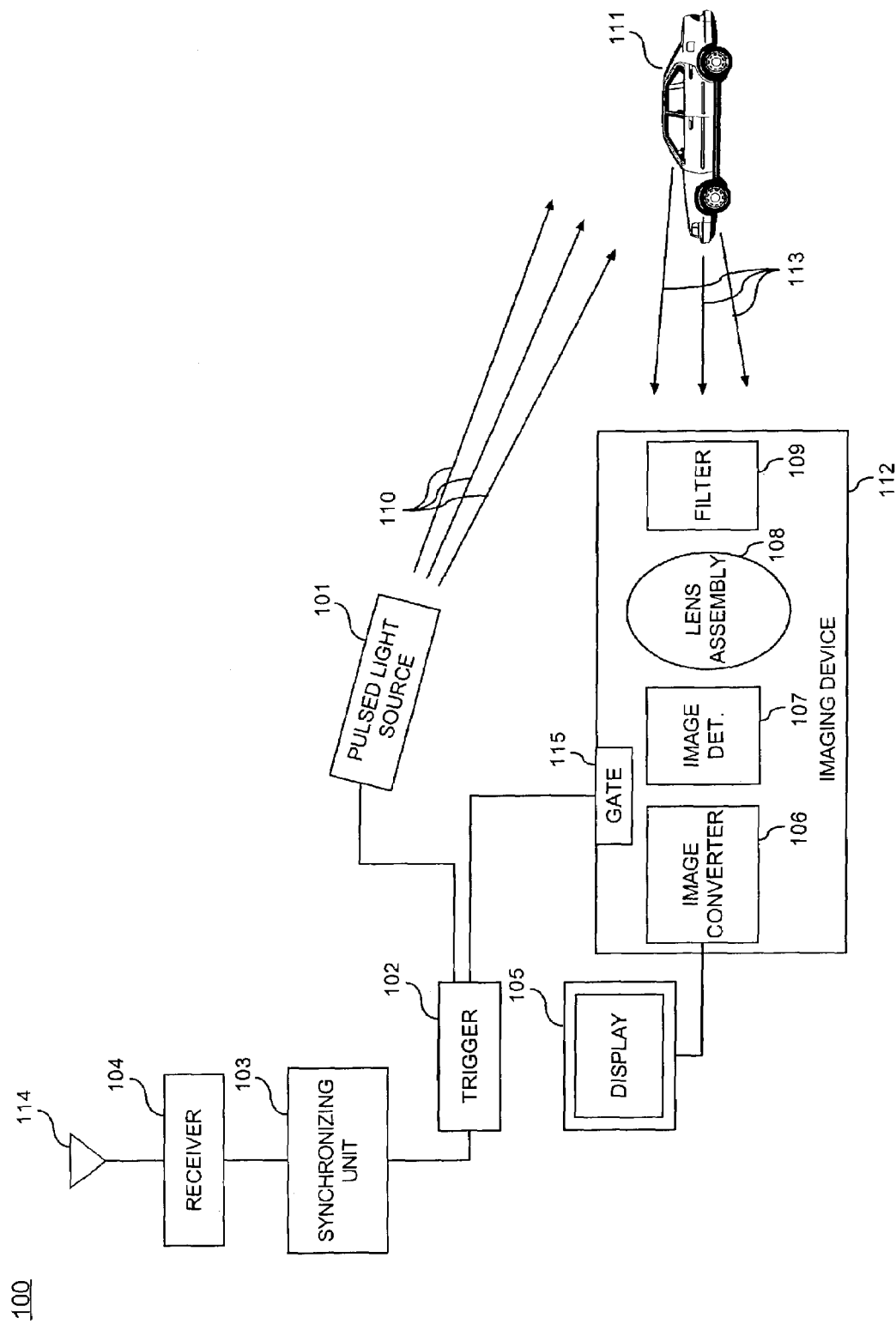
FIG. 1 is a schematic view of an imaging system for object illumination and imaging in accordance with the present invention.

Referring to FIG. 1, a schematic view of an imaging system 100 for object illumination and imaging is shown. The imaging system 100 includes a pulsed light source 101 which can emanate a light pulse 110 which can be scattered by objects to generate scattered light 113. The pulsed light source 101 can be positioned anywhere on a vehicle. For example, in one arrangement the pulsed light source 101 can be configured as a vehicle headlight. In another arrangement, the pulsed light source can be positioned elsewhere on the vehicle, for example on the roof of a vehicle. In yet another arrangement, the pulsed light source can be worn on a human body, for example attached to head gear.

The pulsed light source 101 can be any source of pulsed light which generates light in a spectrum which is visible or invisible to the human eye. For example, the pulsed light source can generate light having a wavelength approximately in the ranges from 0.19 μm to 5 μm. An exemplary pulsed light source can be a laser, for example a Q-switched laser, a pulsed diode laser, a pulsed arc discharge xenon lamp, an electrodeless discharge lamp, an electrodeless radio frequency excited lamp, a light emitting diode, and other such sources. If a laser generator is used as a pulsed light source 101, its output may be homogenized via a fiber optic, a light pipe, or other such means as known by those skilled in the art to uniformly illuminate a target area.

The light 110 generated by the pulsed light source 101 can be pulsed at any repetition rate. In one arrangement, the light 110 can be pulsed at a repetition rate which is greater than a reciprocal time associated with eye inertia. For example, a repetition rate of 16-24 Hz can be used. Further, the duration of the pulse, or pulse width ($\Delta T_{PULSE}$), can be chosen to be very short, for example several femtoseconds, to rather long, for example several microseconds. In any case, $\Delta T_{PULSE}$ should be shorter than about $D_S/c$, where $D_S$ is a desired illumination distance in the field of observation for the imaging system 100, and c is the speed of light.

An imaging device 112 can be provided to detect the scattered light 113. For instance, the imaging device 112 can be mounted at or near the front of a vehicle, on the roof of a vehicle, or again worn on the human body (e.g. head mounted). In one arrangement, the imaging device 112 can include a lens assembly 108 and an image converter 106. The imaging device 112 optionally can include an imaging detector 107 which intensifies the scattered light 113 to improve the quality of received images. Further, a light filter 109 also can be provided. The light filter 109 can be colored glass, an acousto-optic filter, a Liot type filter, an atomic resonance fluorescence imaging monochromator, an atomic or molecular magneto-optical (Faraday, Voigt) filter, a low or high resolution interference filter, or any other spectrally selective imaging filter. The light filter 109 can be used to block light which does not have a spectral composition of scattered light 113. Accordingly, only light having the spectral composition of the scattered light 113 can pass through the light filter 109 to the lens assembly 108. The lens assembly 108 can focus the scattered light 113 on the imaging detector 107, or on the image converter 106 if an imaging detector 107 is not provided. In one arrangement, the focal length of the lens assembly 108 can be adjustable to optimize imaging resolution over a range of distances.

The imaging detector 107 can be gated so that it begins receiving image data at the time that the pulsed light source 101 generates a light pulse 110. The imaging device 107 should continue receiving images for a time duration ($\Delta T_{GATE}$), which is approximately equal to about $(2D_S/c) + \Delta T_{PULSE}$. Alternatively, the gating period can have a duration approximately equal to the sum of $[2(D_B-D_L)/c + \Delta T_{PULSE}]$, where $\Delta T_{PULSE}$ is a duration of at least one of said periodic light pulses, $D_L$ is a distance correlating to a desired observation range minimum, $D_B$ is a distance correlating to a desired observation range maximum, and c is the speed of light.

The time slot can be repeated at fixed times. Accordingly, the imaging device will receive image data only during the optimum light reception time slot, as noted. This mode of illumination also is beneficial when it is desired to increase a number of independent time slots. For example, 40,000 time slots can be provided instead of 20,000. In this case, the area of observation will be in far field, which is further than the area illuminated by low beam headlights. Since the near field area is illuminated by low beam headlights, only part of the distance $D_S$ needs to be imaged with the imaging system of the present invention.

The beginning of each time slot can begin, with respect to a time reference, at a time equal to the fixed time multiplied by an integer. In a preferred arrangement, the time slots are short, non-overlapping, time intervals. The time slots can have a predetermined duration and can be reproducible with predefined time shifts with respect to the time reference. For example, if the time slot is to be repeated 25 times per second, the period between pulses can be 40 ms.

Further, at least one instance of a repeating time slot can be timed to begin at a fixed time relative to a synchronization signal, such as a signal providing a time reference. The time reference can be, for example, at 0.000000000 second of every new year, at 0.000000000 second of every Greenwich time new day, at 0.000000000 of each new hour, 0.0000000000 second of every minute, the beginning of each second, or any other suitable time reference.

A gating device 115 can be used to gate the imaging device. In this arrangement, it is preferable that the gating device 115 be fast enough to adequately activate imaging detector 107 reception upon the light pulse being generated and deactivate imaging detector 107 reception after a time slot equal to $\Delta T_{GATE}$ has elapsed.

The image converter 106 can capture object images, either directly from the lens 108 or from the imaging detector 107, if provided. For example, the image converter 106 can be a charged coupled device (CCD), a charge injected device (CID) or a compliant semiconductor metal oxide (CMOS) camera which is equipped with corresponding digitizing or analog converter. If the image converter 106 is sensitive enough to detect images without use of the imaging detector 107, then a fast light shutter may be used to gate the image converter 106 so that the image converter 106 will be open approximately during the time slot equal to $\Delta T_{GATE}$. Fast light shutters are known to those skilled in the art, for example a Kerr shutter or a Pockels cell can be used. Pockels cells are commercially available from Cleveland Crystals, Inc. of Highland Heights, Ohio.

Object images converted by the image converter 106 can be forwarded to a display 105 for presentation. The display 105 can be any type of display which can present object images. For example, the display can be a microdisplay, such as a plasma display, a light emitting diode (LED) display, a liquid crystal on silicone (LCOS) display, an organic light emitting diode (OLED) on silicon display, (see S. K. Jones et al., *OLED/CMOS Combo Opens a New World of Microdisplay*, Laser Focus World, December 2001, at 55-58), a cathode ray tube (CRT), and other suitable displays. The display also can be a display which is worn by a driver of a vehicle, such as display goggles, or the display can be a heads-up display, for instance where images are projected onto a windshield of a vehicle. If display goggles, or any other type of head-mounted display is used, a stereoscopic image of the road can be obtained by using two imaging devices, one on each side of a vehicle. Accordingly, separate images can be generated for each side of the vehicle. Accordingly, images from the left side of the vehicle can be transmitted to the left eye and images from the right side of the vehicle can be transmitted to the right eye.

A trigger 102 can control the gate timing of the image converter 106 and/or the imaging detector 107, if provided. The trigger 102 can be operatively connected to a synchronizing unit 103. The synchronizing unit 103 can include synchronization circuitry for maintaining time synchronization. Further, the synchronization unit 103 can include a processor for executing software algorithms, and a data storage upon which data and software programs can be stored.

The synchronizing unit 103 can provide a synchronizing signal to insure that the trigger 102 simultaneously activates the pulsed light source 101 and the gating device 115, thereby keeping the pulsed light source 101 synchronized with the image converter 106 and/or the imaging detector 107. For instance, if a laser is used as the pulsed light source, the synchronizing signals can be used to trigger a Q-switch element associated with the laser. If the laser is activated by a second laser, such as pulsed semiconductor laser or a pumping laser, the synchronizing signals can be used to trigger the second laser.

A receiver/timing signal processor (receiver) 104, which is operatively connected to an antenna 114, antenna array or satellite dish, can be provided. The receiver 104 can receive radio frequency (RF) timing signals and provide these signals to the synchronizing unit 103 for use in timing the pulsed light source 101 and the gating device 115. For example, the synchronizing unit 103 and/or receiver 104 can include an internal oscillator and software algorithms that process the RF timing signals. There are a number of timing signal references from earth based time stations that can be used. In one example, the RF timing signals can be timing signals received from either of the National Institute of Standards and Technology (NIST) time stations near Fort Collins, Colo. (WWV and WWVB) or the NIST time station in Kauai, Hi. (WWVH). The timing signals transmitted by WWV and WWVH are specified as having a tolerance which is less than one microsecond at the transmitter site with reference to Coordinated Universal Time (UTC). Over the last several years, however, the timing signals have measured to be within fifty nanoseconds of UTC. Timing signals also can be obtained from a Wide Area Augmentation System (WAAS) which is commonly used to provide precision guidance to aircraft. Further, timing signals also can be proved in desired geographic regions, such as large metropolitan areas, with the use of a local positioning system. A local positioning system can comprise three or more local transmitters which can emanate RF signals carrying timing information and data from which coordinates can be determined.

In another example, the RF timing signals can be timing signals received via a modern Global Positioning Satellite (GPS) receiver, which can provide even greater time synchronization precision. For instance, RF timing signals can be received from the United States GPS system, the Russian Global Navigation Satellite System (GLONASS), and/or any another global positioning system. Modern GPS receivers can produce time synchronization with a standard deviation of ten nanoseconds or less. Such receivers are available from a number of commercial providers, such as TrueTime, Inc. of Santa Rosa, Calif. Further, methods for using GPS or GLONASS to achieve sub-nano second precision are known, for example as disclosed by Wlodzimierz Lewandowski of Jacques Azoubib Bureau International des Poids et Mesures in an article entitled *GPS+GLONASS: Toward Subnanosecond Time Transfer*, GPS World, vol. 9, at 30-39 (1998). The use of GPS or GLONASS also can have the added benefit of providing vehicle location and tracking information. The use of GPS and GLONASS for providing vehicle location and tracking information is known to those skilled in the art.

In operation, imaging systems which are installed in vehicles can generate and receive uniquely timed light pulses. Accordingly, light pulses generated by a first vehicle will not overlap with light pulses generated by a second vehicle, and thus will not arrive at the second vehicle while the second vehicles imaging detector is activated to receive light. Likewise, in the case that the second vehicle uses a gated image converter in lieu of an imaging detector, light pulses from the first vehicle will not arrive to the second vehicle while the shutter of the gated image converter in the second vehicle is open. Accordingly, the amount of light received from other vehicles can be minimized, thereby reducing glare caused by the lights of other vehicles.

Figure 2A:
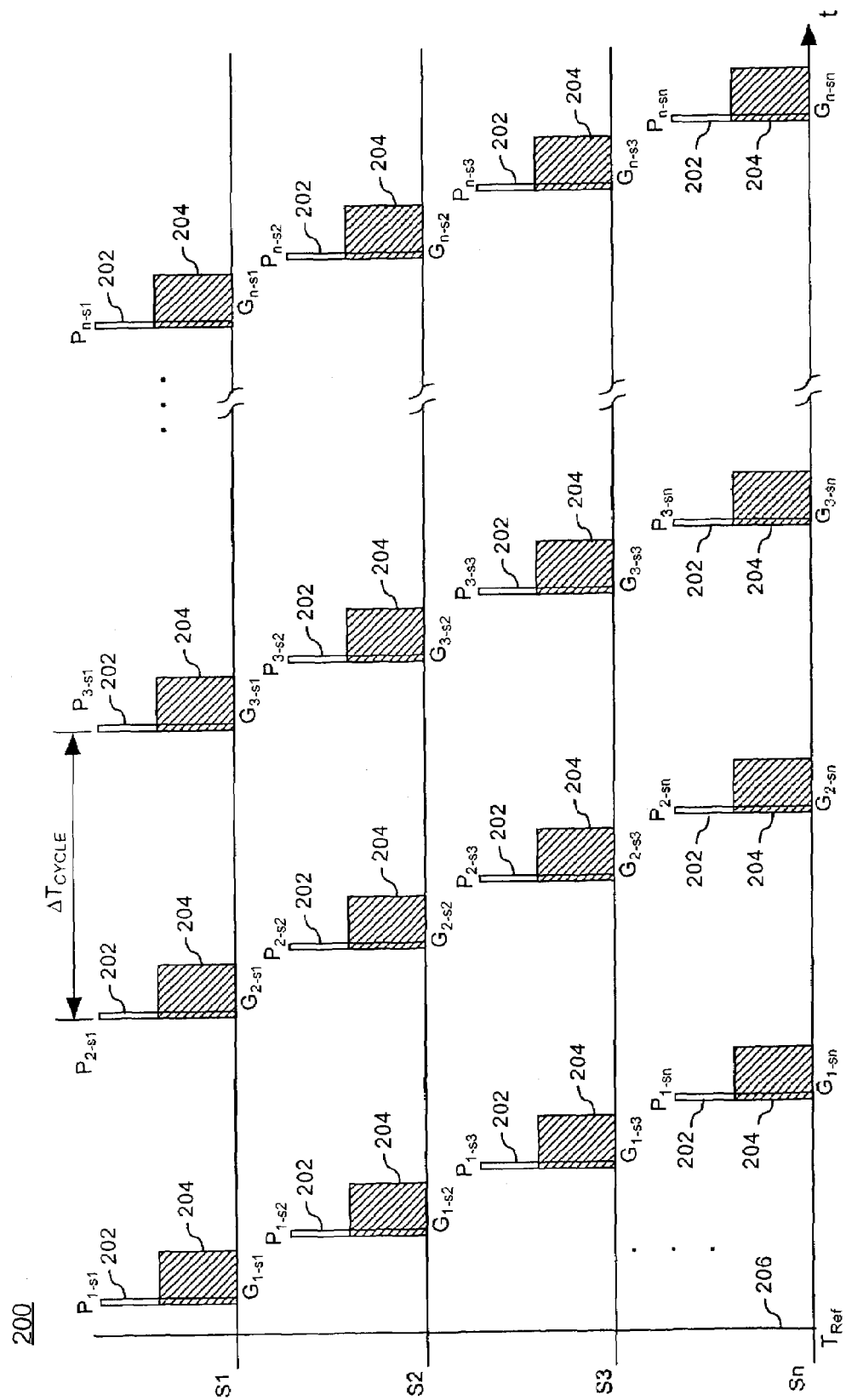
FIG. 2A is a timing diagram representing illuminating pulses and gating periods associated with an exemplary imaging system in accordance with the present invention.

A diagram representing an exemplary pulse timing chart 200 is shown in FIG. 2A. The timing chart 200 displays a plurality of light pulse streams $S_1$, $S_2$, $S_3$, $S_n$, each of which can represent the uniquely timed light pulses 202 generated by a different imaging system. The pulse streams $S_1$, $S_2$, $S_3$, $S_n$ can be synchronized using a time reference 206, such as an RF timing signal. The pulse timing chart 200 also shows the gating period ($\Delta T_{GATE}$) 204 associated with each pulse 202. For instance, pulse stream $S_1$ includes light pulses $P_{1-s1}$, $P_{2-s1}$, $P_{3-s1}$, $P_{n-s1}$ and gating periods $G_{1-s1}$, $G_{2-s1}$, $G_{3-s1}$, $G_{n-s1}$, pulse stream $S_2$ includes light pulses $P_{1-s2}$, $P_{2-s2}$, $P_{3-s2}$, $P_{n-s2}$ and gating periods $G_{1-s2}$, $G_{2-s2}$, $G_{3-s2}$, $G_{n-s2}$, and so on. As noted, each gating period can begin when the pulse with which the gating period is associated begins.

Figure 2B:
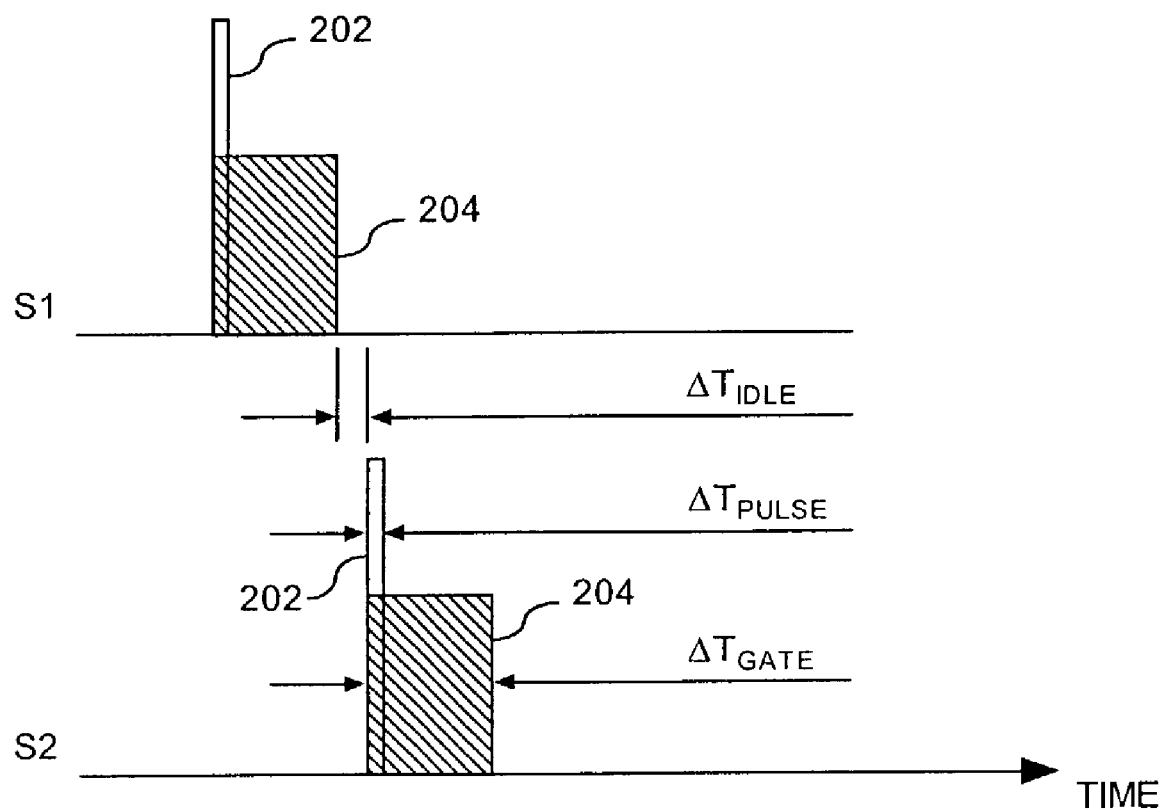
FIG. 2B is an exploded representation of illuminating pulses of FIG. 2A.

Referring to FIGS. 2A and 2B, the time that elapses between the end of a gating period for a particular light pulse and the beginning of a next light pulse being generated, such as a light pulse generated in another light pulse stream, can be referenced as idle time ($\Delta T_{IDLE}$). Accordingly, the duration of one time slot ($\Delta T_Z$) can be defined as $\Delta T_Z = \Delta T_{GATE} + \Delta T_{IDLE}$. Further, the time for one complete cycle in a light pulse stream can be defined as $\Delta T_{CYCLE}$, where $\Delta T_{CYCLE}$ can be measured as the time elapsing between the start time of a first light pulse and the start time of a second light pulse in the same light pulse stream. Ideally, assuming one pulse stream can operate in each time slot, the maximum number ($N_S$) of pulse streams that can operate without an overlap of gating periods can be determined by the number of time slots available. The number of time slots available can be determined by the formula $N_S = \Delta T_{CYCLE} / \Delta T_{GATE}$. However, this formula assumes absolutely precise synchronization of light pulses and gating of the imaging detector and/or imaging converter. Alternatively, the equation $N_S = \Delta T_{CYCLE} / (\Delta T_{GATE} + \Delta T_{IDLE}) = \Delta T_{CYCLE} / \Delta T_Z$ can be used to determine the maximum number of time slots, thereby allowing for variations in timing signals and synchronization among imaging systems. For example, if $\Delta T_{GATE} = 1-2$ µs, an appropriate value for $\Delta T_{IDLE}$ may be 100-400 ns. Nonetheless, it may be more desirable to make $\Delta T_{GATE}$ and $\Delta T_{IDLE}$ much shorter to maximize $N_S$. For instance, if $\Delta T_{CYCLE}$ is 50 ms and $\Delta T_Z = 5$ µs, $1 \times 10^4$ time slots are provided and $1 \times 10^4$ pulse streams can operate without overlap of gating periods. If $\Delta T_{CYCLE}$ is 50 ms and $\Delta T_Z = 2.5$ µs, $2 \times 10^4$ time slots are provided and $2 \times 10^4$ pulse streams can operate without overlap of gating periods. Assuming an operational range $D_S$ of 300 m, $\Delta T_{CYCLE} = 50$ ms, $\Delta T_{PULSE} = 50$ ns and $\Delta T_{IDLE} = 10$ ns, $2.42 \times 10^4$ time slots can be provided. Notably, $\Delta T_{PULSE}$ can be even shorter, for example as short as 10 ns.

It may appear that a pulse width $\Delta T_{PULSE}$ of 10 ns would not give adequate image quality because for every second of operation only 200 ns of image data for a particular point in a road is received, assuming $\Delta T_{CYCLE}$ is 50 ms. However, the distance of effective illumination does not correlate to pulse width. Accordingly, a series of images which are received with a repetition rate of at least 16-20 images per second will appear like a continuous image stream, even if each image gating period $\Delta T_{GATE}$ is extremely short.

Additionally, short light pulses and short gating periods which are time shifted with respect to the light pulses can be used to improve visibility of objects or a roadway when the visibility is deteriorated due to clouds, fog, dust, or any other airborne molecules or particulates which can scatter light (hereinafter referred to as particulates). In operation, the short gating periods can be used to reduce or eliminate the reception of light which has been scattered by the particulates. In particular, the gate can be timed to close immediately after receiving light scattered by objects being illuminated, but before significant radiation from light scattered by the particulates is received. In consequence, the use of short light pulses and gating periods can provide much higher image quality when airborne particulates are present. For example, a pulse duration ($\Delta T_{PULSE}$) which is less than $D_S/c$ can be advantageous.

As noted, the light pulses can be synchronized using the RF timing signals. For example, the light pulses emanating from an imaging system in a vehicle can be timed so that each light pulse and its associated gating period occur within a time slot $\Delta T_Z$ allocated for the vehicle. This allocation of the light pulses into defined time slots prevents light pulses and gating periods from overlapping into multiple time slots. Accordingly, a pulse emanated by a first vehicle will have significantly dissipated before a gating period begins for a second vehicle, thereby significantly reducing the likelihood of the second vehicle receiving glare caused by the first vehicle. In one arrangement, time slots may be assigned for a selected groups of vehicles, for example vehicles used by the military, the government, law enforcement agencies, ambulance services, fire rescue services, tractors, and so on. Vehicles also can be grouped by the type of vehicle, for example luxury vehicles, small vehicles, large vehicles, etc. Further, the a different time slot duration can be used for different vehicle types. For instance, the duration of a time slot $\Delta T_Z$ can be 2-3 times longer for emergency vehicles as compared to other types of cars. Correspondingly the distance which is illuminated and observed in front of vehicle can be 2-3 times larger. In another arrangement, the imaging systems in different groups of vehicles can be configured to emit light pulses at different wavelengths.

In another example, let it be assumed that a first imaging system is operating in a first vehicle and specified to illuminate a region in front of the first vehicle for a distance ($D_S$) of 300 m. Also assume the light pulses are synchronized with the UTC. Accordingly, the gating period $\Delta T_{GATE}$ for the first vehicle should be $(2 \times 300)/(3 \times 10^8) = 2 \times 10^{-6}$. Further assume that the imaging system generates a light pulse having a duration $\Delta T_{PULSE} = 100$ ns and a repetition rate ($R_c$) of 25 Hz. Further, assume that the idle period $\Delta T_{IDLE}$ is significantly shorter than the gating period $\Delta T_{GATE}$ so that the time slot $\Delta T_Z$ is approximately equal to $\Delta T_{GATE}$. Accordingly, the probability ($P_m$) of the first vehicle meeting an oncoming second vehicle which emanates light pulses during the gating period of the first vehicle is given by the equation $P_m = \Delta T_{GATE} R_c = (2 \times 10^{-6}) \times 25 = 5 \times 10^{-5}$. In other words, approximately one out of 20,000 cars will emanate a light pulse which may be detected by the first illumination system during the gating period.

Next, assume that $R_M$ is the average rate of the first vehicle encountering a second vehicle which has the same type of illuminating system and which operates in a randomly selected time slot. Further, assume that $T_{TR}$ represents the amount of time the first vehicle is being operated on the road. Accordingly, the probability ($P_m$) of the imaging system of the first vehicle receiving significant glare at least once from light pulses of the second vehicle can be estimated by the equation $P_m = \Delta T_{Gate} R_c T_{TR} R_M$, where $P_m < 1$. Hence, the likelihood of a vehicle receiving significant glare from another vehicle's illumination system is extremely low.

In contrast, if the pulses are not synchronized into time slots, such as those synchronized with UTC, the equation for the probability ($P_m$) of a first vehicle receiving significant glare from an oncoming second vehicle will be different. In this case, the probability $P_m$ should be multiplied by the number of pulses ($N_P$) emanated by the second vehicle as it approaches the first vehicle. $N_P$ can be determined by equation $N_P = [D_S/(v_1 + v_2)] R_c$ (where $v_1 + v_2$ is the mutual velocity of two cars towards each other). Depending on the mutual velocity of cars, $N_P$ may vary. For example, assume that $D_S = 250$ m, $v_1 = 20$ m/s, $v_2 = 10$ m/s and $R_c = 50$ Hz. In this example $N_P = 416$. Hence, in comparison to a situation when two approaching vehicles emit light pulses in pre-defined time slots, the probability of glare increases significantly when pre-defined, synchronized time slots are not used. Accordingly, the use of a timing signal for pulse synchronization substantially decreases the probability of an imaging system receiving glare from an imaging system of an oncoming vehicle.

Imaging Detector Considerations

The Doppler effect caused by vehicles moving toward each other is preferably considered when implementing the present invention. In particular, the minimal detection bandwidth which is required for the imaging detector 107 to detect a particular frequency of light can be estimated from the amount of frequency shift that is likely to occur due to the Doppler effect (Doppler shift). The Doppler shift can be determined by the equation $\Delta v = 2v (V/c) = 2V/\lambda$, where v is the frequency of the light, $\Delta v$ is the change in frequency of the light, V is the relative velocity of the vehicles with respect to each other, and $\lambda$ is the wavelength of the light. For example, if the maximum velocity of each of two vehicles as they approach each other is 50 mph, the relative velocity between the vehicles is V=100 mph (44.7 m/s) since the cars are moving toward each other. If the wavelength ($\lambda$) of the light pulses emanated by a first vehicle are 700 nm, the Doppler shift $\Delta v$ associated with those light pulses computes to be 127.7 MHz. If the wavelength ($\lambda$) of the light pulses emanated are 1500 nm, the Doppler shift $\Delta v$ is 59.6 MHz. Further, the Fourier transform of short light pulses can be evaluated and taken into consideration. Accordingly, for this example, a detection bandwidth of 100 MHz-300 MHz will be adequate if pulses with duration 1-10 ns are used.

The resolution R of an imaging detector is equal to $\lambda/\Delta\lambda$, where $\lambda$ is the wavelength of the light pulses being detected and $\Delta\lambda$ is variation in wavelength due to Doppler shift. It is preferable that the imaging detector have a resolution of approximately R=c/2V or $3.35 \times 10^6$ in the example. Further expanding the example, if the area of the imaging detector is approximately 3-5 cm$^2$ and the field of view is 1-2 steradians (sr), it can be estimated that the ideal luminosity-resolving power product (LRPP) for imaging a moving object using a very narrowband light pulse is approximately $10^7$-$10^8$ cm$^2$ sr. A number of imaging detectors which provide the necessary LRPP are currently known to those skilled in the art.

In one arrangement, the imaging detector can be a resonance ionization imaging detector (RIID). A suitable RIID is disclosed in U.S. Pat. No. 6,008,496 to Winefordner et al., which is incorporated herein by reference. When a RIID is used, the RIID can be activated to detect images when the atoms of an atomic vapor in an RIID cell are excited into their Rydberg states. To decrease or eliminate the RIID noises, atoms can be excited into Rydberg states with a lifetime which is more than $2D_s/c$. In the case, a high voltage pulse, for example 1-50 kV, can be applied when the $\lambda_2$ pulse is ended. To excite the atoms into their Rydberg states, the atomic vapor can be illuminated by a trigger light source which emanates light having a wavelength of $\lambda_2$. For example, if Cs is used for the atomic vapor, the wavelength $\lambda_2$ can be about 535 nm-510 nm to excite one or several Rydberg states.

When in its ground state, the atomic vapor absorbs light which has a wavelength tuned to the resonance transition of the atomic vapor. Within the RIID, a laser with a predetermined wavelength can illuminate the atomic vapor to excite the atomic vapor into Rydberg states. An electric field pulse or additional laser radiation then can be applied to the atoms excited into the Rydberg states, thereby producing free electrons and ions. As a result of selective ionization of atoms in the RIID cell, the free ions and electrons can be created and accelerated by an electric field towards the RIID screen, which can have a phosphor coating, or any other high energy electron sensitive screen to produce an image. Alternatively, the free electrons or ions can be accelerated towards an imaging signal amplifier, such as microchannel plate. In such an arrangement, free electrons from the microchannel plate can be directed to strike the screen.

Hence, the pulsed light source 101 can generate narrow band light pulses which are tuned to an appropriate resonance transition for the atomic vapor within the RIID cell. For example, cesium (Cs) vapor has resonance transitions of 894.35 nm and 852.11 nm, rubidium (Rb) has resonance transitions of 794.76 nm or 780.02 nm, potassium (K) has resonance transitions of 769.90 nm or 766.49 nm and mercury (Hg) has a resonance transition of 253.7 nm and a non-resonance transition 438.5 nm. In order to effectuate the gating action in the RIID, the trigger light source can be pulsed for a length of time equal to about $\Delta T_{GATE}$. It should be noted that any other atomic or molecular vapor which can selectively absorb specific frequencies of light can be used and the present invention is not so limited.

RIID cells are susceptible to noise caused by nonselective multiphoton ionization of atoms and molecules due to the photo electric effect from the RIID surfaces. To eliminate the noise, a first voltage pulse can be applied to electrodes of the RIID cell in order to remove all noise electrons and ions after the gate is closed. For a RIID cell without micro channel plate (MCP), the pulse duration can be about 10 ns-500 ns and this voltage may be about 10 V-1000 V. Such a voltage pulse is not high enough to ionize the atoms of the atomic vapor which have been excited into the Rydberg state. A second voltage pulse of about 1000 V up to 50 kV can be applied to ionize the atoms which have been excited into the Rydberg state. This second voltage pulse can accelerate electrons or ions toward a screen or other imaging detector which is sensitive to charged particles, thereby producing an image of detected objects. The atoms which have been excited into the Rydberg state may also be ionized after the gate is closed by applying a delayed pulsed laser radiation, for example a 1064 nm Neodymium:Yttrium/Aluminum/Garnet (Nd:YAG) laser.

Notably, the RIID can provide spectral selection since the atomic vapor absorbs fairly narrow bands of light which correspond to the resonance transitions. For example, the RIID can have a selection bandwidth can be approximately from 200 MHz up to 1 GHz. Accordingly, filter 109 is not required if a RIID is used, which can be very beneficial since filters are usually limited as to the amount of LRPP. For example, filters such as acoustooptic filters, can pass a maximum LRPP of approximately $3 \times 10^3$ cm$^2$ sr. As noted, the RIID has a much greater value of LRPP, which reduces image distortions, noise and glare from oncoming vehicles, thereby providing images with higher quality.

The ability of the RIID to process images from light which has a very narrow frequency bandwidth provides further advantages. For example, the probability of a first vehicle having a first imaging system receiving glare from a second vehicle having a second imaging system can be reduced by operating the first and second imaging systems at different frequencies. Accordingly, the first imaging system can be configured so that light pulses emanating from the second imaging system are not detectable by the first imaging system, and vice versa. In this manner, different light pulses can be used by different groups of vehicles to expand the number of vehicles that can use the imaging systems without excess glare being generated. If, for example, the imaging device has a bandwidth approximately 300 MHz, and the center frequency has a wavelength anywhere in the spectral range 1.52 µm-1.76 µm, almost 90,000 independent spectrally separated channels may be provided to decrease the probability of the imaging system receiving glare from oncoming vehicles. Thus, combining spectral selection with time slot allocation substantially decreases the probability of an imaging system receiving glare from an imaging system in another vehicle. Combining the above spectral selection example with our previous time slot example, the total probability of encountering a vehicle operating with an imaging system operating in the same time slot and at the same wavelength will be $1/(90,000 \times 20,000) = 5.55 \times 10^{-10}$. Notably, the reciprocal number of this probability is at least three orders of magnitude greater than total number of cars on the Earth.

At this point it should be noted that other imaging detectors can be used and the invention is not limited to a RIID. For example, the imaging detector can be an atomic and/or molecular vapor ultranarrowband imaging detector, as described in O. I. Matveev et al., *Narrow-band resonance-ionization and fluourescence imaging in a mercury-vapor cell*, Optics Letters, Vol. 23, no. 4, at 304-06 (1998). An atomic and/or molecular magnetooptical filter also can be used also can be used as an imaging detector. (See, e.g., B. Yin et al., *Theoretical Model for a Faraday Anomalous Dispersion Optical Filter*, Optics Letters, Vol. 16, no. 20 at 1617-19 (1991). See also, R. I. Billmers et al., *Experimental Demonstration of an Excited-state Faraday Filter Operating at 532 nm*, Optics Letters, Vol. 20, no. 1 at 106-08 (1995); E. Dressler et al., *Theory and Experiment for the Anomalous Faraday Effect in Potassium*, Journal Optical Society of America, Vol. 13, no. 9 at 1849-58 (1996); B. P. Williams et al., *Magneto-optic Doppler Analyser: A New Instrument to Measure Mesopause Winds*, Applied Optics, Vol. 35, no. 33 at 6494-6503 (1996)). Further, a spectral hole burning filter also can be used. (See, e.g., W. E. Moerner, *Persistent Spectral Hole-Burning: Science and Applications*, Springer Verlag, Berlin (1988); B. S. Ham et al., *Enhanced Nondegenerate Four-Wave Mixing Owing to Electromagnetically Induced Transparency in a Special Hole-Burning Crystal*, Optics Letter, Vol. 22, no. 15 at 1138-40 (1997); H. Hemmati, *Narrow-band Optical Filters Made by Spectral Hole-Burning*, NASA Tech Brief, August, 1997 at 54; A. Rebane, *Femtosecond Time-And-Space-Domain Holography*, Trends in Optics, Academic Press at 165-88 (1996); K. Fujita et al., *Room Temperature Persistent Spectral Hole Burning of Eu 3+ in Sodium Alumosislicate Glasses*, Optics Letters, Vol. 23, no. 7 at 543-45 (1998)).

Regardless of the type of imaging detector which is used, images captured by the imaging detector can be utilized for any number of purposes. For example, as noted, the images can be presented on a display. The images also can be stored to a storage medium. For example, the images can be stored to a hard disk drive, a video tape, a digital video disk, or any other suitable storage suitable for storing images. Accordingly, the images can be available for viewing and analysis at a later time. The images also can be analyzed in real-time using an image processing system. For instance, the images can be analyzed and processed as part of an accident warning or accident avoidance system. Still, the images can be used for other purposes and the present invention is not so limited.

Automatic Time Slot Allocation Based Upon Direction and/or Road Being Traveled To further reduce the probability of a first vehicle receiving glare from a second vehicle, time slots for the gating period of each imaging system can be allocated based upon a direction of travel and/or upon which road a vehicle is traveling. For example, an allocation system can be implemented to insure that vehicles traveling in opposite directions on a same road will not share a same time slot.

Figure 3A:
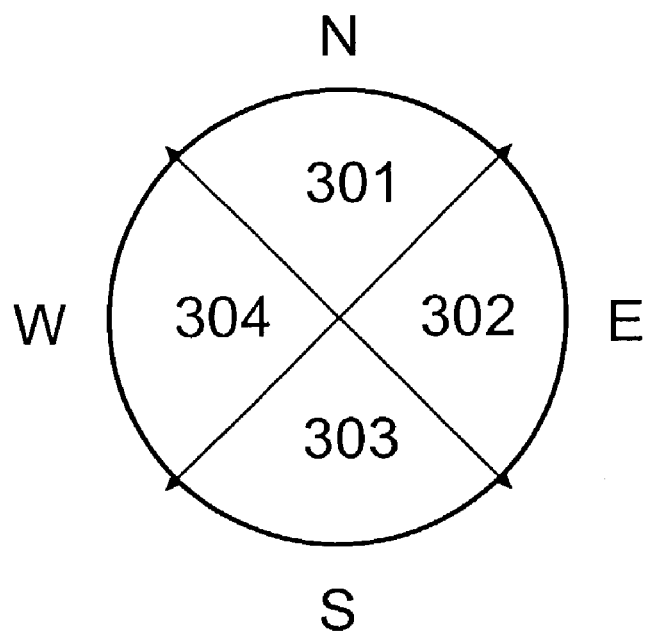
FIG. 3A is a diagram illustrating potential directions of travel which are associated with time slot groupings in accordance with the present invention.
Figure 4:
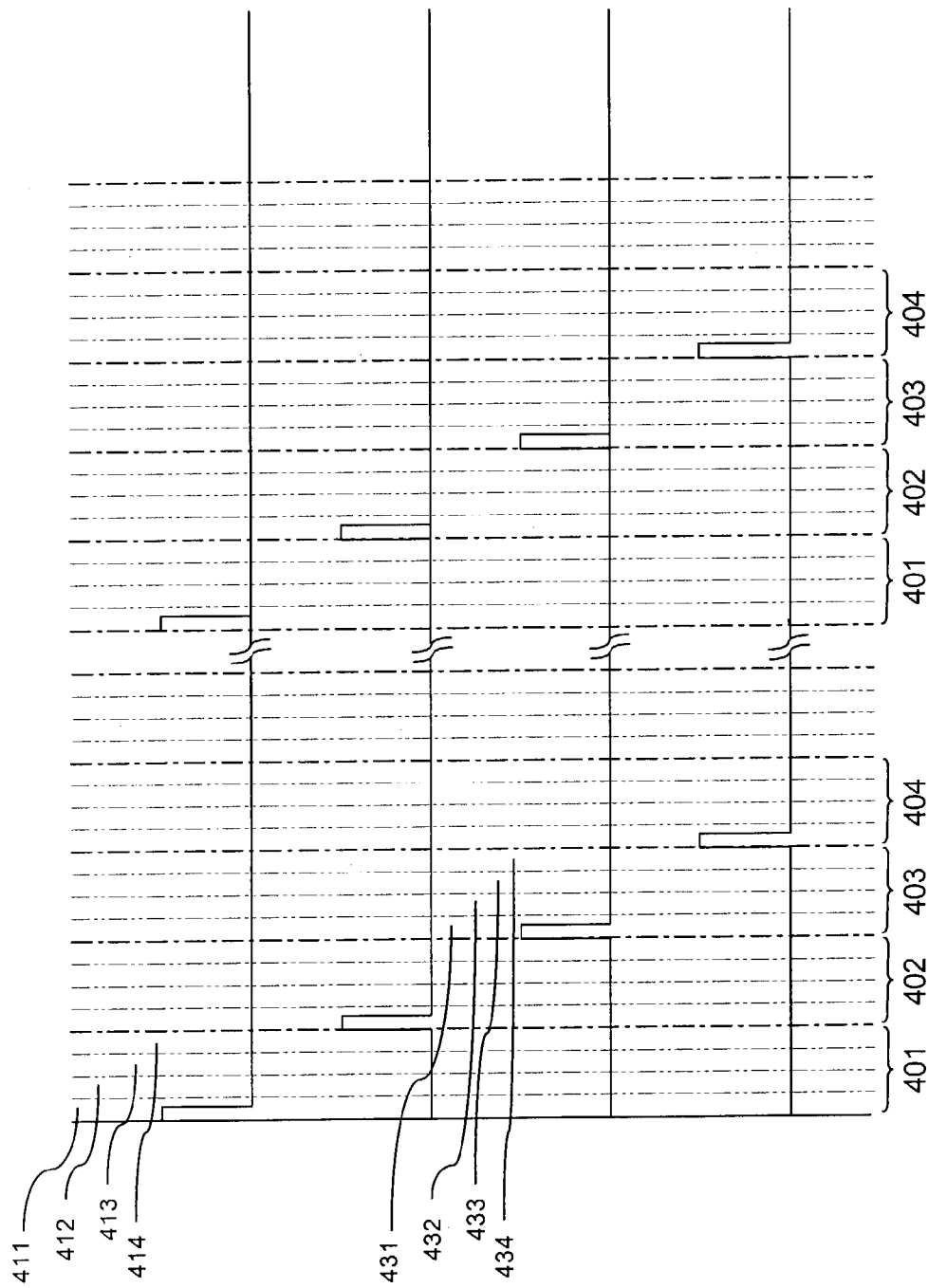
FIG. 4 is a timing diagram representing exemplary time slot groupings in accordance with the present invention.

Referring initially to FIGS. 3A and 4, the directions of travel can be divided into two or more groups. For example, the directions of travel can be divided into four directional groups 301, 302, 303, 304, with each directional group representing those directions that are within +/−45° of a particular direction, for instance north, south, east and west. Importantly, the invention is not limited to this example. In another arrangement there can be two directional groups representing those directions that are within +/−90° of a particular direction. In other arrangements the number of directional groups can be three, five, six, seven, eight, and so on. Importantly, a great number of directional groups can be provided. For instance, if there are 40,000 available time slots, there can be up to 40,000 directional groups. It should be noted, however, that the number of time slots and the number of groups need not have a one to one correspondence because a plurality of time slots can be allocated to any directional group. Further, the time slots can be grouped in any way. For instance, time slots can be sequentially grouped. For example, the first 100 time slots can be assigned to time slot group 1, the next 100 time slots can be assigned to time slot group 2, and so on. In another arrangement, the time slots can be distributively grouped. For example, every $10^{th}$ time slot can be assigned to time slot group 1, and each time slot following a time slot in group 1 can be assigned to time slot group 2, etc.

Still, other time slot allocation systems can be used. For instance, if there are 20,000 available time slots, but only 100 time slots are needed for each roadway, 100 time slots can be allocated for that roadway while at least a portion of the remaining time slots can be left to operate in an alternate time synchronized mode, for example as described above.

Vehicles traveling in a direction falling in a particular directional group can use a time slot from a group of time slots which are allocated to that directional group. For example, vehicles traveling in a direction which is within directional group 301 can use any of the time slots 411, 412, 413, 414 within a first group 401, while vehicles traveling in a direction which is within directional group 303 can use any of the time slots 431, 432, 433, 434 within a third group 403.

The imaging system can be preconfigured to associate the time slot groups 401, 402, 403, 404 with particular directional groups 301, 302, 303, 304. For example, the imaging system can receive a directional heading from a compass, WAAS, or a satellite positioning system, GPS or GLONASS, and then process this data to determine the appropriate time slot group. Further, timing signals also can be proved in desired geographic regions, such as large metropolitan areas, with the use of a local positioning system. A local positioning system can comprise three or more local transmitters which can emanate RF signals carrying timing information and data from which coordinates can be determined.

In another arrangement, indicators 380, 382 can be provided in, on or proximate to roadways to provide roadway, lane and/or directional information to imaging systems. For instance, the indicators can be mounted under the roadway surface, in roadway reflector assemblies, on guard rails, on traffic signals, on street lamps, and so on. The indicators 380, 382 can propagate a low level RF signal containing roadway, lane, directional information and/or other information. The RF signal can be received by a vehicle's imaging system, for example using an RF receiver. The indicators 380, 382 can include a data storage and an RF transmitter, which can be low power. The indicators 380, 382 also can include a wired or wireless modem for communicating with a control center if it is desired that the indicators 380, 382 be updateable. Alternatively, the indicators 380,382 can include a communication port which can be accessed by a service technician. The indicators can be connected to utility power, use photovoltaic cells and a storage battery, or any other power source.

In yet another arrangement, time slots can be selected manually. For example, when a driver of a vehicle changes from a first road to a second road, a driver of the vehicle can activate a switch which changes the time slot manually.

Figure 3B:
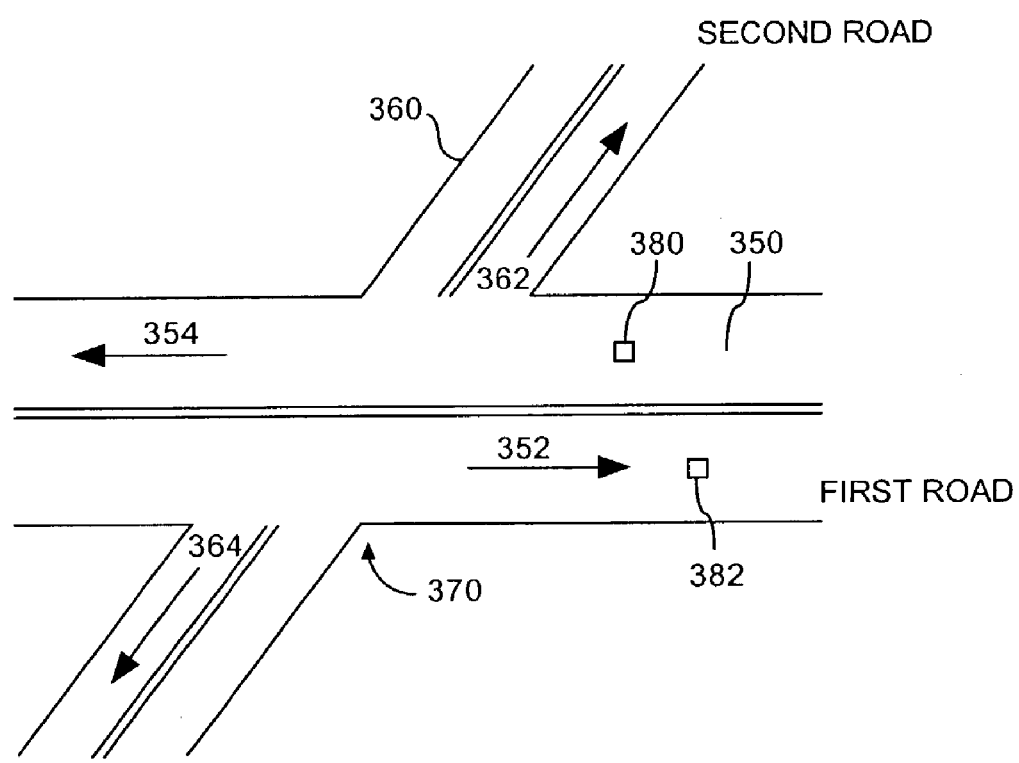
FIG. 3B is a diagram illustrating roads which are associated with time slot groupings in accordance with the present invention.

Referring to FIGS. 3B and 4, time slots also can be allocated based upon which roadway and/or lane on the roadway a vehicle is traveling. In one example, all vehicles traveling in lane 352 can use a time slot selected from the first time slot group 401, while all vehicles traveling in lane 354 can be use a time slot selected from the third time slot group 403. In this arrangement, absolute directional information is not required. Rather, only information which is relative to the road upon which the vehicle is traveling is required. Further, information relative to a lane on the road also can be provided. For example, a road may have lanes identified as northbound lanes and lanes identified as southbound lanes, although some portions of the road may follow a path that is not consistently oriented north and south.

Nonetheless, so long as vehicles traveling in a first direction on a roadway are using time slots from a different time slot group than vehicles traveling in an opposing direction on the same roadway, the probability of an imaging system in a first vehicle receiving glare from an imaging system in a second vehicle is substantially reduced.

In a congested region, such as an urban area, a road may cross many other roads. Hence, in such a case it may be desirable to have a large number of groups of time slots available for use by vehicles traveling on different roadways. Further, time slots and groups of time slots can be shared by vehicles which are on roadways which do not cross near the present location of the two vehicles.

At this point it also should be noted that allocations of time slot groups for a particular roadway can change over a length of a road. For example, the time slot groups allocated for the second road 360 can be changed for a portion of the road which is at, or near, an intersection 370 of the second road 360 with the first road 350. Accordingly, if lanes 362, 364 have the same respective time slot allocations as lanes 552, 354, the time slots can be re-allocated to prevent vehicles approaching the intersection 370 on the second road 360 from causing glare for vehicles approaching the intersection on the first road 350, and vice versa.

Algorithms which determine an appropriate time slot group for a vehicle on a roadway can be processed by a control center and wirelessly transmitted to the vehicle's imaging system, or processed by the imaging system itself. For example, the synchronizing unit 103 can include a processor and a data storage, as noted. Alternatively, a second processor and/or a second data storage can be provided in the imaging system for storing and processing data and algorithms. In any case, the algorighms can be used to process road map data and mapping coordinates, such as local positioning system data, WAAS data or GPS and/or GLONASS coordinate data, using a database to determine an appropriate time slot group for the vehicle. Once an appropriate time slot group is selected, a second algorithm can select a time slot from the time slot group if the time slot group contains more than one time slot.

In another arrangement, the indicators 380, 382 can be used to provide the proper time slot information to a vehicle's imaging system. For example, the indicators 380, 382 then can sequentially assign the time slots to vehicles as the vehicles pass the indicators. In another arrangement, the time slots can be provided randomly or following some prescribed algorithm. The indicators 380, 382 can be programmed to operate autonomously using a predetermined time slot group from which to issue time slots, or the indicators 380, 382 can be communicatively linked to a control center to receive operational instructions.

As electronics systems currently are not 100% reliable, it is conceivable that an indicator 380, 382 can fail, or that a receiver or compass being used to establish direction can fail or lose communication with the imaging system. Hence, the imaging system can be predisposed to switch to a backup time slot should there be a problem identifying the appropriate time in which the imaging system should be operating. For example, a portion of available time slots can be reserved as backup time slots. Thus, one of these time slots can be randomly selected by an imaging system when the imaging system cannot otherwise determine in which time slot it should be operating. Further, the backup time slots can be utilized by vehicles operating on roads which have not yet been allocated time slot groups, for instance roads which are new or lightly traveled. The reliability of the directional systems being used and the number of roads not having a time slot group allocation should be evaluated to determine the appropriate number of backup time slots.

Although multiple embodiments of the invention have been described in detail for purposes of illustration, various modifications may be made without departing from the spirit and scope of the invention. Importantly, examples provided in this specification are provided for illustration only and are not to be construed as limiting the scope or content of the invention in any way. Accordingly, the invention is not to be limited except as by the appended claims.

I claim:

1. A method of providing reduced glare roadway imaging between at least two oncoming motor vehicles, comprising the steps of:
    selecting at least one repeating time slot for each of said motor vehicles based at least in part upon which roadway said motor vehicles are disposed and a coordinated time reference signal received by said motor vehicles, wherein said selected time slots for a first one of said motor vehicles and a second one of said oncoming motor vehicles are different;
    triggering a light source mounted on each of said motor vehicles to emit periodic light pulses synchronized with said repeating time slots selected for each of said motor vehicles; and
    receiving scattered light from objects being illuminated by said light source mounted on each of said motor vehicles in an imaging device of each of said motor vehicles during a gating period correlating to said repeating time slot selected for each of said motor vehicles.

2. The method of claim 1, further comprising the step of processing said received scattered light to obtain imaging information to be displayed, said imaging information representing said illuminated objects.

3. The method of claim 1, wherein said selecting step further comprises the step of identifying in which lane of said roadway each of said vehicles is disposed and selecting said time slot for each of said vehicles based at least in part upon said identified lane for each of said vehicles.

4. The method of claim 1, wherein said selecting step further comprises the step of determining a direction of movement for each of said vehicles and selecting said time slot for each of said vehicles based at least in part upon said determined direction of movement for each of said vehicles.

5. The method of claim 1 further comprising the step of defining said time slot to have a duration at least as long as a duration of said gating period, wherein said duration of said gating period is approximately equal to the sum of $(2DS/c)+\Delta TPULSE$, where $\Delta TPULSE$ is a duration of at least one of said periodic light pulses, DS is a desired illumination distance for the imaging system's field of operation, and c is the speed of light.

6. The method of claim 1 wherein said selecting step further comprises the step of identifying said roadway in which said vehicles are disposed using at least one of a global positioning system, a local positioning system, a wide area augmentation system, and a roadway indicator.

7. The method of claim 1, wherein said selecting step further comprises the steps of:
    receiving data representing a location and a direction of travel for each of said vehicles; and
    processing said data using a database to determine said at least one repeating time slot for each of said vehicles.

8. The method of claim 7, wherein said received data is received from at least one of a global positioning system, a local positioning system, a wide area augmentation system, and a roadway indicator.

9. The method of claim 1, wherein said selecting step further comprises the step of receiving an RF signal transmitted by at least one of a global positioning system, a local positioning system, a wide area augmentation system and a roadway indicator which identifies said at least one repeating time slot.

10. The method of claim 1, wherein said coordinated time reference signal is a wirelessly propagated synchronization signal.

11. The method of claim 10, wherein said coordinated time reference signal is synchronized with Coordinated Universal Time (UTC).

12. The method of claim 1, further comprising the step changing said repeating time slot to a second repeating time slot upon losing a reception of said coordinated time reference signal.

13. The method of claim 1, further comprising the step of changing said repeating time slot for at least one of said vehicles to a second repeating time slot upon the occurrence of at least one condition selected from the group consisting of said one of said motor vehicles approaching an intersection and said one of said motor vehicles changing roadways.

14. A reduced glare roadway imaging system a motor vehicle, said reduced glare roadway imaging system comprising:
    at least one light source for emitting periodic light pulses;
    a synchronization receiver system configured for obtaining a coordinated time reference signal;
    a processor for determining a repeating time slot based at least in part upon which roadway said motor vehicle is disposed and said obtained coordinated time reference signal, wherein said determined repeating time slot for said motor vehicle and one or more oncoming motor vehicles are different;

a trigger for modulating emissions of periodic light pulses from said light source, said emissions of periodic light pulses being synchronized with said repeating time slot; and an imaging device for receiving light resulting from said light pulses being scattered by objects, said imaging device receiving said scattered light during a gating period correlating with said emissions of light pulses.

15. The system of claim 14, further comprising a display for presenting said received scattered light as images.

16. The system of claim 14, wherein said processor further evaluates which lane of said roadway said vehicle is disposed to determine said repeating time slot.

17. The system of claim 14, wherein processor further evaluates a direction of movement of said vehicle to determine said repeating time slot.

18. The system of claim 14, wherein said time slot has a duration at least as long as a duration of said gating period, wherein said duration of said gating period is approximately equal to the sum of $(2DS/c)+\Delta TPULSE$, where $\Delta TPULSE$ is a duration of at least one of said periodic light pulses, DS is a desired illumination distance, and c is the speed of light.

19. The system of claim 14, wherein said roadway in which said vehicle is disposed is determined using at least one of a global positioning system, a local positioning system, a wide area augmentation system and a roadway indicator which identifies said at least one repeating time slot.

20. The system of claim 14, further comprising a receiver system which receives coordinates representing a location of said vehicle and a direction of travel of said vehicle, wherein said processor processes said coordinates using a database to determine said repeating time slot.

21. The system of claim 20, wherein said coordinates are received from at least one of a global positioning satellite and a local positioning system.

22. The system of claim 14, further comprising a receiver for receiving an RF signal transmitted by a roadway indicator which identifies said repeating time slot.

23. The system of claim 14, wherein said repeating time slot is changed to a second repeating time slot upon loss of reception of said time reference.

24. The system of claim 14, wherein said repeating time slot is changed to a second repeating time slot upon the occurrence of at least one condition selected from the group consisting of said motor vehicle approaching an intersection and said motor vehicle changing roadways.

* * * * *